(No Model.) 2 Sheets—Sheet 1.

A. McKELLAR.
HUB.

No. 254,996. Patented Mar. 14, 1882.

WITNESSES:
C. Neveux
C. Sedgwick

INVENTOR:
A. McKellar
BY Munn & Co
ATTORNEYS.

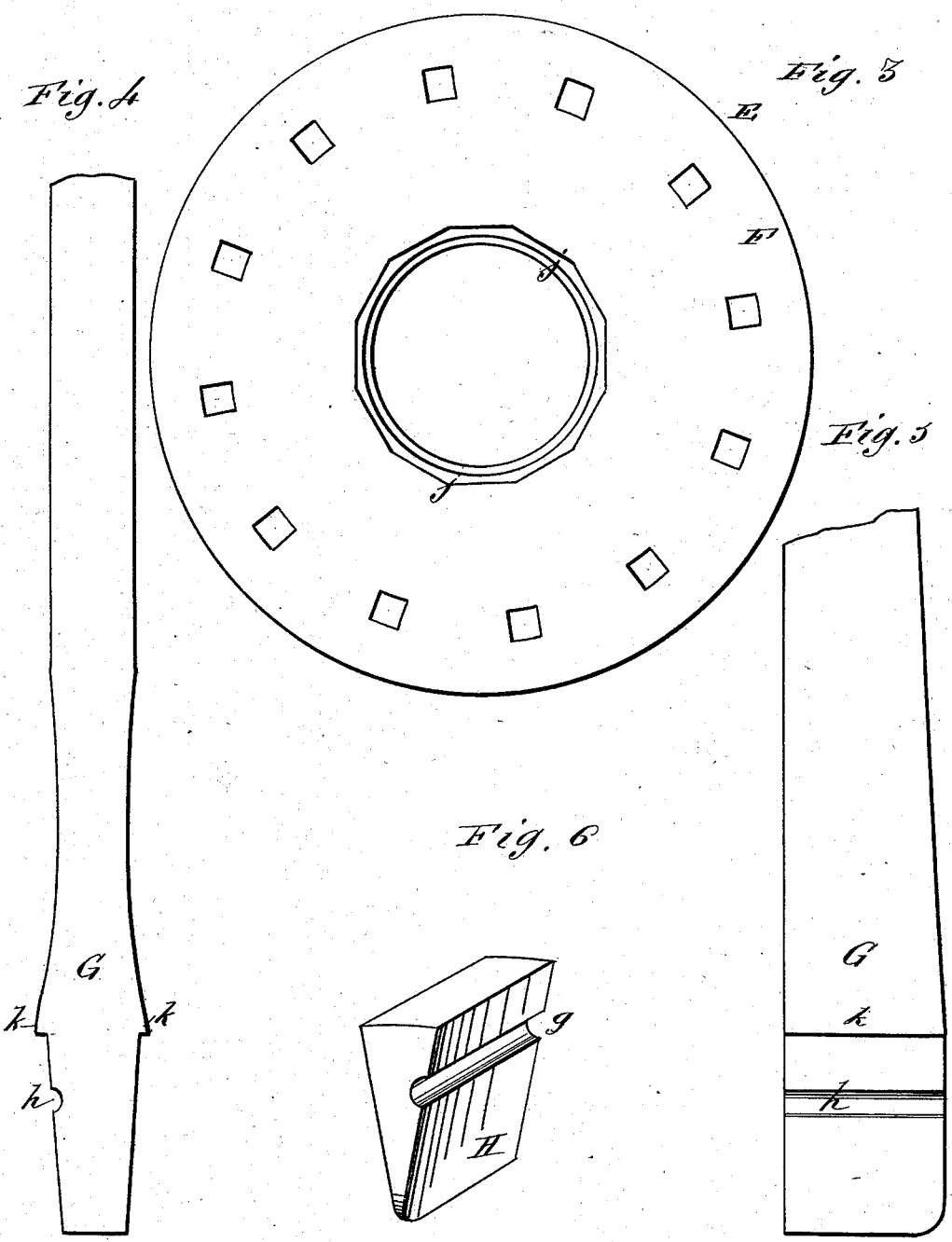

UNITED STATES PATENT OFFICE.

ANGUS McKELLAR, OF FORT DOUGLAS, UTAH TERRITORY.

HUB.

SPECIFICATION forming part of Letters Patent No. 254,996, dated March 14, 1882.

Application filed January 19, 1882. (No model.)

*To all whom it may concern:*

Be it known that I, ANGUS McKELLAR, of Fort Douglas, in the Territory of Utah, have invented a new and useful Improvement in Metallic Hubs for Vehicle-Wheels, of which the following is a full, clear, and exact description.

My invention consists of such construction of the metallic hub that the hub is adapted to be used on light freight, farm, and other wagons having wooden axles, the same number of spokes being used in the wheel as is ordinarily used with the wooden hubs used on such wagons.

Reference is to be had to the accompanying drawings, forming a part of this specification, in which similar letters of reference indicate corresponding parts in all the figures.

Figure 1:
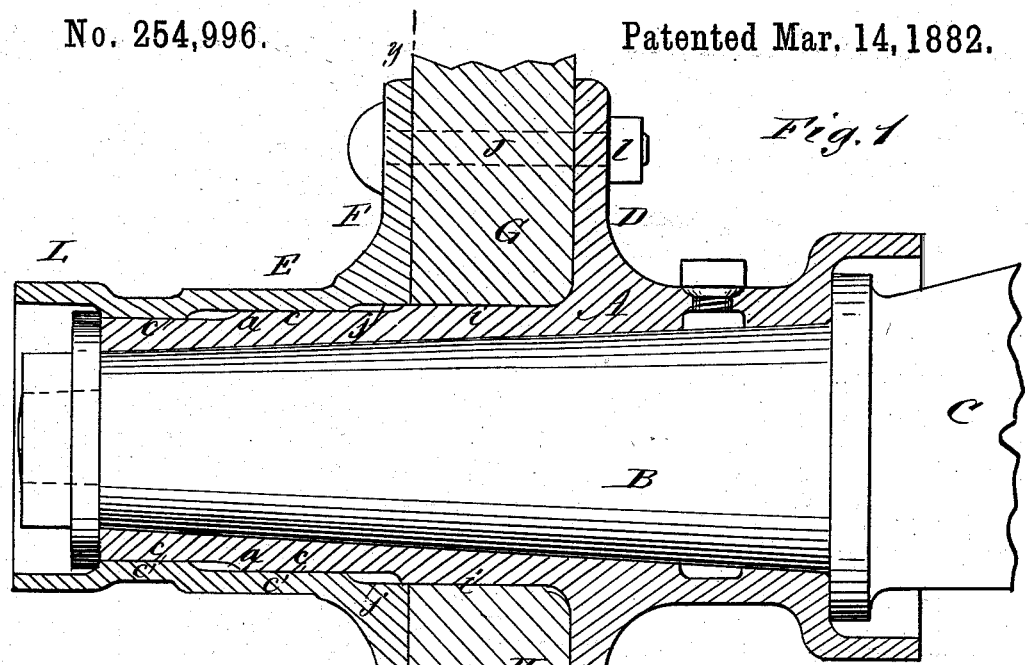
Figure 2:
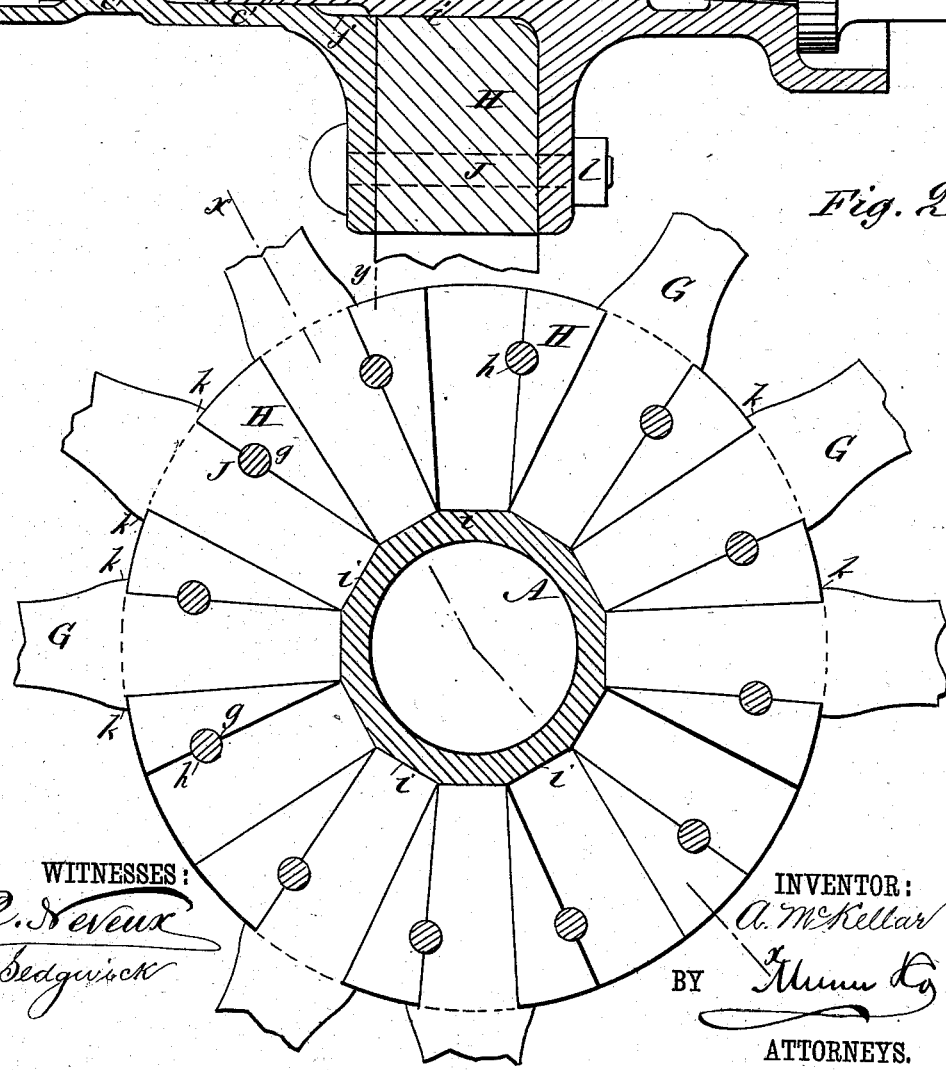

Figure 1 is a longitudinal sectional elevation of my improved metallic hub, taken on the line $x\ x$ of Fig. 2. Fig. 2 is a cross-sectional elevation taken on the line $y\ y$ of Fig. 1. Fig. 3 is an elevation of the flanged removable sleeve. Fig. 4 is an edge elevation of one of the spokes. Fig. 5 is a side elevation of one of the spokes, and Fig. 6 is a perspective view of one of the wedges.

A represents the axle-box, which is made of unusual internal taper to fit upon the thimble B of the wooden axle C. The axle-box is formed in the ordinary manner with the flange D.

E represents the sleeve, which fits upon the forward part of the axle-box, and which is also formed with the ordinary flange, F. Between these flanges D and F are held the spokes G of the wheel and the division-wedges H, which are placed between the spokes. The spokes G are formed at their lower ends with the grooves $h$, which are parallel with the axis of the hub, and the wedges are formed with the corresponding grooves, $g$, which grooves, when the spokes and wedges are in place, form passages for the bolts J, which pass through the flanges D and F and retain and hold securely the spokes and wedges in place. At the point where the spokes G rest upon the axle-box the outer circumference of the axle-box is made polygonal in form, so as to form the flat seats $i\ i$ (shown in Fig. 2) for the inner ends of spokes to rest upon. The polygonal portion of the axle-box is of greater length than the greatest width of the inner ends of the spokes, and the sleeve E is chambered out and made polygonal a short distance upon the inside, as shown at $j\ j$ in Figs. 1 and 3, to fit upon the polygonal portion of the axle-box. From the polygonal portion of the axle-box to the forward end thereof the box is circular in form, and its external diameter is gradually reduced, to lessen the weight of the hub and to give it a symmetrical shape, and this reduction of the box is made in such manner as to form the step $a$ and the straight surfaces $c\ c$, as shown in Fig. 1; and the internal diameter of the sleeve E is tapered from the point backward to fit the box, having the straight surfaces $c'\ c'$ to fit upon the straight surfaces $c\ c$. By this construction the sleeve E is adapted to have longitudinal movement upon the axle-box, so that any shrinkage of the spokes may be taken up by simply screwing up the nuts $l\ l$ on the bolts J. The outer end of the sleeve is formed with the enlarged point-band L, which is of sufficient size to permit the use of the large-sized nuts commonly used on thimble-skein axles to be used with my improved metal hub; or a linchpin may be used if the hub is applied to an axle made to receive a linchpin instead of a nut.

The spokes are formed with the shoulders or offsets $k\ k$, which reach over the upper edges of the wedges H H, and cover and make a close and water-proof joint therewith, which is of great advantage in the durability of the wheel.

By the use of the wedges it will be seen that the same number of spokes used in wheels having wooden hubs may be used with my metal hub, and that the great taper of the bearing of wooden axles is accommodated, and that the spokes may be square at their inner ends, resting on flat surfaces, and that the sleeve may be adjusted to tighten the spokes in case of shrinkage, thus making the hub adapted for use upon the styles of wagon and axles above mentioned.

Having thus described my invention, I claim as new and desire to secure by Letters Patent—

1. The combination, with the axle-box A, provided with the flange D, the flat seats $i$, the step $a$, and the straight surfaces $c\ c$, of the sleeve E, provided with the flange F, the straight surfaces $c'$ $c'$, and the flat seats J, substantially as and for the purpose set forth.

2. The combination, with the axle-box A, provided with the flange D, the flanged sleeve E, and the bolts J, of the spokes G, provided with the grooves $h$ and the shoulders $k$, and the wedges H, provided with the grooves $g$, substantially as and for the purpose set forth.

3. The wedges H, formed with the grooves $g$, and the spokes G, formed with the grooves $h$, in combination with the flanged axle-box A, flanged sleeve E, and the bolts J, substantially as described.

ANGUS McKELLAR.

Witnesses:
  JOS. F. SIMMONS,
  JOHN SQUIRES.